United States Patent
Akashi et al.

(10) Patent No.: US 9,893,573 B2
(45) Date of Patent: Feb. 13, 2018

(54) ROTOR OF MOTOR AND SUCH MOTOR

(71) Applicant: FANUC CORPORATION, Yamanashi (JP)

(72) Inventors: Koudai Akashi, Yamanashi (JP); Hidetoshi Uematsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 219 days.

(21) Appl. No.: 15/057,534

(22) Filed: Mar. 1, 2016

(65) Prior Publication Data
US 2016/0261152 A1    Sep. 8, 2016

(30) Foreign Application Priority Data
Mar. 3, 2015    (JP) ................. 2015-041804

(51) Int. Cl.
*H02K 1/22*    (2006.01)
*H02K 1/27*    (2006.01)
*H02K 1/30*    (2006.01)
*H02K 7/00*    (2006.01)

(52) U.S. Cl.
CPC ............. *H02K 1/22* (2013.01); *H02K 1/2773* (2013.01); *H02K 1/30* (2013.01); *H02K 7/003* (2013.01)

(58) Field of Classification Search
CPC .......... H02K 1/22; H02K 1/2773; H02K 1/30; H02K 7/003; H02K 7/006; H02K 1/28; H02K 1/32
USPC ................................. 310/60 A, 61
See application file for complete search history.

(56) References Cited

U.S. PATENT DOCUMENTS 6,437,474 B1    8/2002    Chu

FOREIGN PATENT DOCUMENTS

| JP | 5244741 A | 9/1993 |
|---|---|---|
| JP | 5344668 A | 12/1993 |
| JP | 2007189875 A | 7/2007 |
| JP | 201119298 A | 1/2011 |
| JP | 2011019298 A * | 1/2011 |
| WO | 2014129086 A1 | 8/2014 |

OTHER PUBLICATIONS

English Abstract and Machine Translation for Japanese Publication No. 2007-189875 A, published Jul. 26, 2007, 11 pgs.
English Abstract and Machine Translation for Japanese Publication No. 05-244741 A, published Sep. 21, 1993, 10 pgs.
(Continued)

*Primary Examiner* — Naishadh Desai
(74) *Attorney, Agent, or Firm* — Fredrikson & Byron, P.A.

(57) ABSTRACT

A rotor able to enhance the strength in the radial direction of the rotor member. A rotor includes a shaft and a tubular rotor member which is fixed to the outside of the shaft in the radial direction. The shaft has a first part which contacts an inner circumferential surface of the rotor member, a second part which is arranged separated from the first part in the axial direction and which contacts an inner circumferential surface of the rotor member, a third part which extends between the first part and the second part and which has an outer diameter smaller than the first part and the second part, and a projection which extends from the third part to the outside in the radial direction and which contacts the inner circumferential surface of the rotor member.

5 Claims, 4 Drawing Sheets

(56) References Cited

OTHER PUBLICATIONS

English Abstract and Machine Translation for Japanese Publication No. 05-344668 A, published Dec. 24, 1993, 9 pgs.
English Abstract and Machine Translation for Japanese Publication No. 2011-019298 A, published Jan. 27, 2011, 13 pgs.
Untranslated Decision to Grant a Patent mailed by Japan Patent Office (JPO) for Application No. JP 2015-041804, dated Apr. 25, 2017, 3 pages.
English machine translation of Decision to Grant a Patent mailed by Japan Patent Office (JPO) for Application No. JP 2015-041804, dated Apr. 25, 2017, 3 pages.
Untranslated Decision of Refusal mailed by Japan Patent Office (JPO) for Application No. JP 2015-041804, dated Nov. 8, 2016, 5 pages.
English machine translation of Decision of Refusal mailed by Japan Patent Office (JPO) for Application No. JP 2015-041804, dated Nov. 8, 2016, 4 pages.
Untranslated Notification of Reasons for Refusal mailed by Japan Patent Office (JPO) for Application No. JP 2015-041804, dated Jun. 14, 2016, 4 pages.
English machine translation of Notification of Reasons for Refusal mailed by Japan Patent Office (JPO) for Application No. JP 2015-041804, dated Jun. 14, 2016, 4 pages.

* cited by examiner

ROTOR OF MOTOR AND SUCH MOTOR

BACKGROUND OF THE INVENTION

1. Field of the Invention

The invention relates to a rotor of a motor and to a motor.

2. Description of the Related Art

Known in the art is a rotor which is formed with a gap between a shaft and rotor core so as to prevent leakage of magnetic flux (for example, Japanese Patent Publication No. 5-244741A and Japanese Patent Publication No. 5-344668A).

Conventionally, at the time of rotation of a rotor, the rotor member which constitutes the rotor may deform in the radial direction due to the centrifugal force, as a result of which eccentricity may occur in the rotor member. To prevent such eccentricity of the rotor member, it has been demanded to enhance the strength of the rotor member in the radial direction.

SUMMARY OF INVENTION

In an aspect of the invention, a rotor of a motor comprises a shaft which extends along an axis and a tubular rotor member which is fixed to radially outside of the shaft so as to surround the shaft. The shaft includes a first part which contacts an inner circumferential surface of the rotor member; and a second part which is arranged so as to be separated from the first part in the axial direction, and which contacts an inner circumferential surface of the rotor member.

Further, the shaft includes a third part which extends between the first part and the second part, and which has an outer diameter smaller than those of the first part and the second part; and a projection extending from the third part toward radially outside so as to contact an inner circumferential surface of the rotor member. A gap is formed between the third part and an inner circumferential surface of the rotor member. The projection may extend over the entire circumference of the shaft.

The rotor member may include a plurality of rotor cores which are aligned in the axial direction; a nonmagnetic member which is arranged between two of the plurality of rotor cores which adjoin each other in the axial direction; and a tie rod which extends through the plurality of rotor cores and the nonmagnetic member in the axial direction. The projection may contact the nonmagnetic member. In another aspect of the invention, the motor comprises the above-mentioned rotor.

BRIEF DESCRIPTION OF THE DRAWINGS

These and other objects, features, and advantages of the invention will be clarified with reference to the detailed description of illustrative embodiments of the invention shown in the attached drawings, in which.

DETAILED DESCRIPTION

Figure 1:
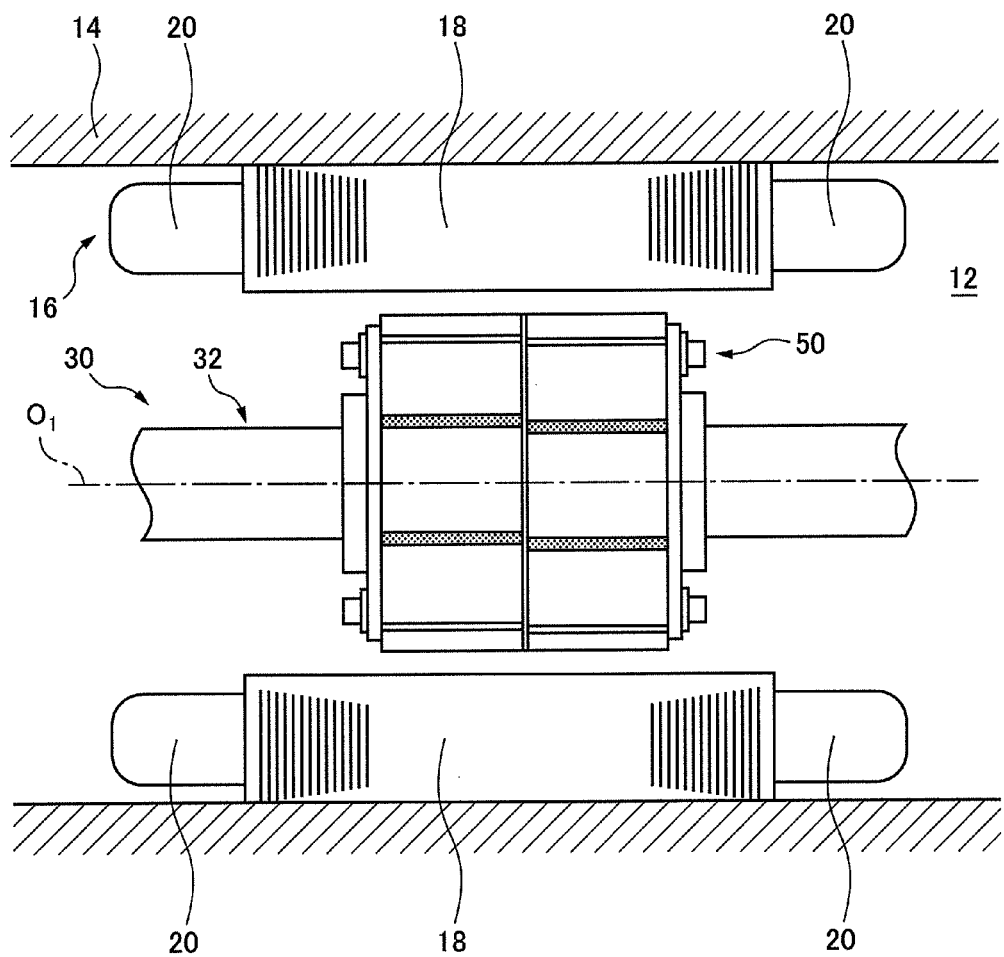
FIG. 1 is a side view of a motor according to an embodiment of the invention, a part of which is shown by cross-section.

Below, embodiments of the invention will be explained in detail based on the drawings. First, referring to FIG. 1, a motor 10 according to an embodiment of the invention will be explained. Note that, in the following explanation, the axial direction indicates a direction along the axis $O_1$ of the shaft 32 shown in FIG. 1, the radial direction indicates a radial direction of a circle centered about the axis $O_1$, and the circumferential direction indicates a circumferential direction of the circle centered about the axis $O_1$. Further, for convenience of explanation, the left direction in FIG. 1 corresponds to front direction in the axial direction (axially frontward).

The motor 10 includes a housing 14 which defines an internal space 12, a stator 16 fixed in the internal space 12 of the housing 14, and a rotor 30 rotatably arranged at radially inside of the stator 16. The stator 16 includes a stator core 18 and a coil 20 wound around the stator core 18.

Figure 2:
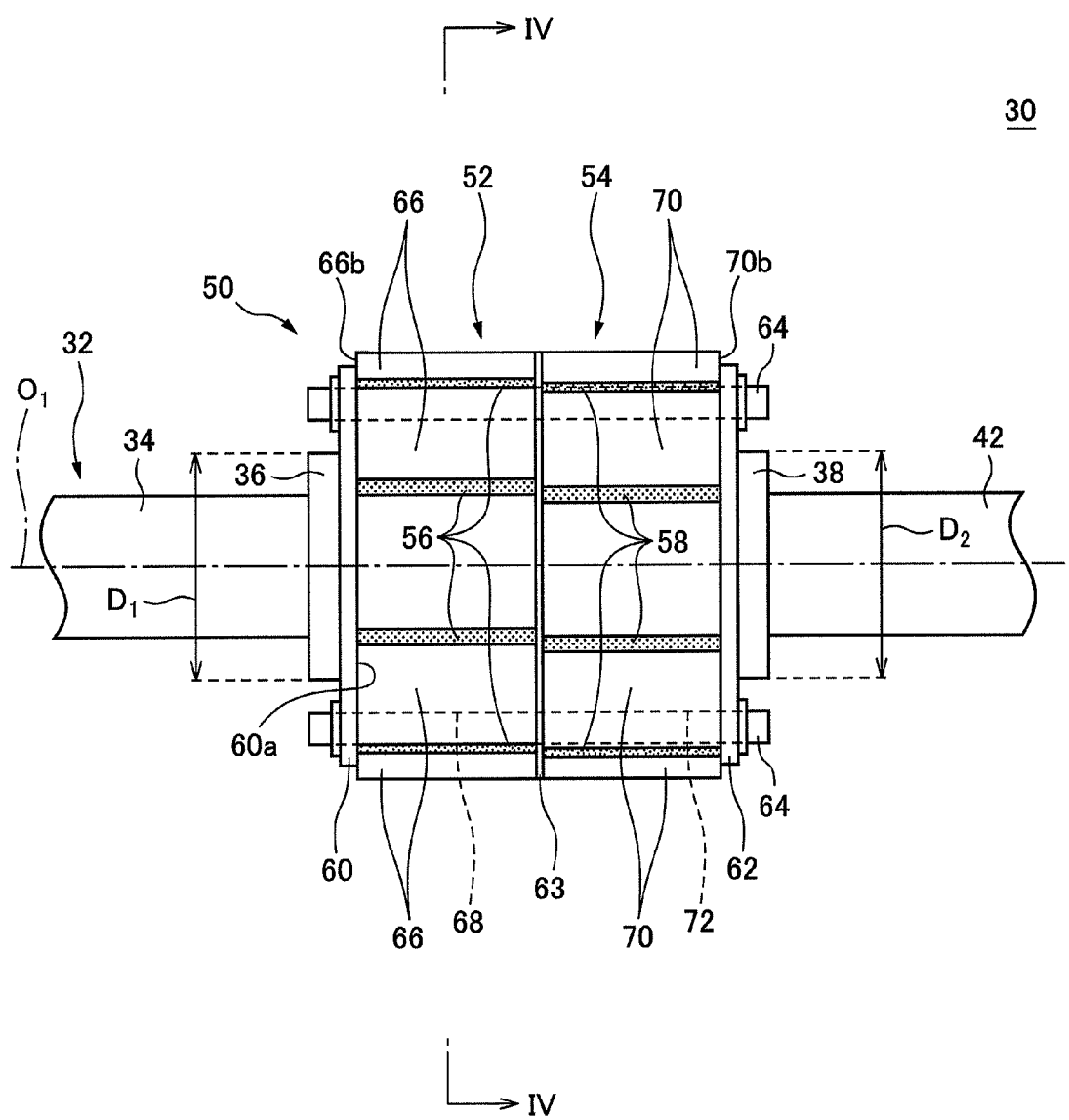
FIG. 2 is a side view of the rotor shown in FIG. 1.

Next, referring to FIG. 2 to FIG. 4, the rotor 30 according to this embodiment will be explained. The rotor 30 is a so-called radial-type rotor. The rotor 30 includes a shaft 32 extending in the axial direction and a rotor member 50 fixed to radially outside of the shaft 32 so as to surround the shaft 32.

Figure 3:
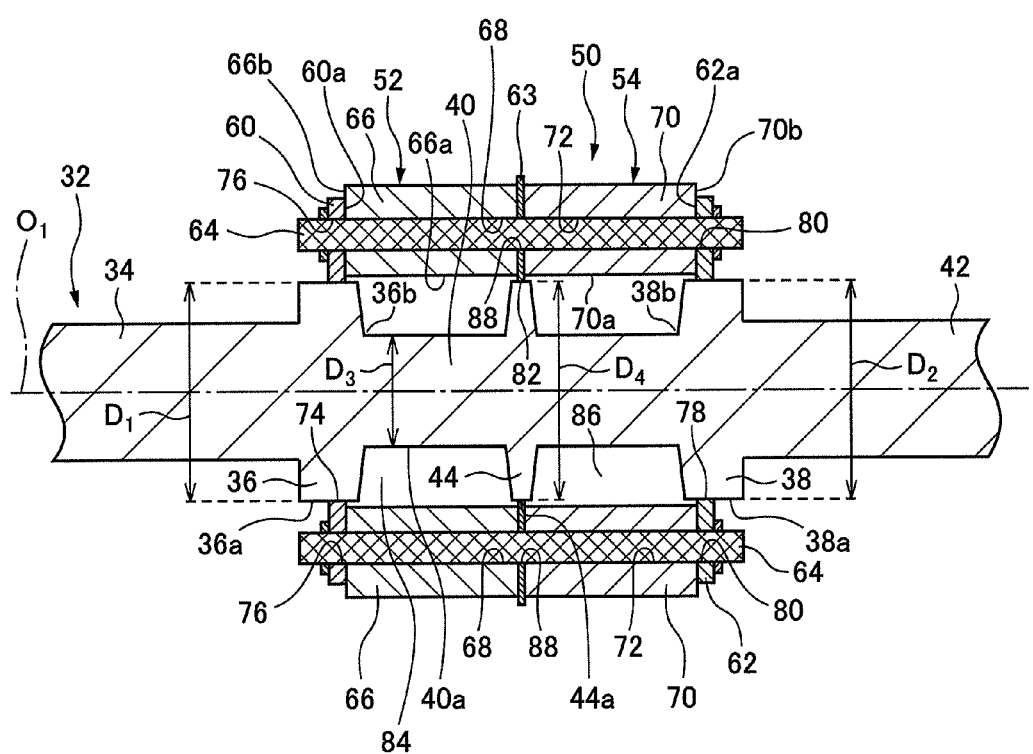
FIG. 3 is a cross-sectional view along III-III in FIG. 4.

As shown in FIG. 3, the shaft 32 includes an output part 34, a first large diameter part (first part) 36, a second large diameter part (second part) 38, a small diameter part (third part) 40, a base end part 42, and a projection 44. The output part 34 is mechanically connected to an external device (e.g., a spindle of a machine tool) at its front end, and outputs rotational force to the external device. On the other hand, the base end part 42 is terminated at its rear end in the internal space 12 of the housing 14.

The first large diameter part 36 projects out from an axially rear end of the output part 34 toward radially outside, and extends in the circumferential direction over the entire circumference of the shaft 32. The first large diameter part 36 includes a cylindrical outer circumferential surface 36a having an outer diameter $D_1$.

The second large diameter part 38 is arranged so as to be separated axially rearward from the first large diameter part 36 by a predetermined distance. Specifically, the second large diameter part 38 projects out from an axially front end of the base end part 42 toward radially outside, and extends in the circumferential direction over the entire circumference of the shaft 32.

The second large diameter part 38 includes a cylindrical outer circumferential surface 38a having an outer diameter $D_2$. In this embodiment, the outer diameter $D_2$ is substantially the same as the outer diameter $D_1$ (i.e., $D_1 \approx D_2$).

The small diameter part 40 extends between the first large diameter part 36 and the second large diameter part 38. Specifically, the small diameter part 40 extends axially frontward from an axially front end 38b of the second large diameter part 38 to an axially rear end 36b of the first large diameter part 36, and has an outer diameter $D_3$. The outer diameters $D_3$ is smaller than the outer diameters $D_1$ and $D_2$ (i.e., $D_1 \approx D_2 > D_3$).

The projection 44 is arranged at the center in the axial direction of the small diameter part 40. Specifically, the projection 44 is integrally formed at the small diameter part 40 so as to project out from the small diameter part 40 toward radially outside. In this embodiment, the projection 44 extends in the circumferential direction over the entire circumference of the small diameter part 40, and has a cylindrical outer circumferential surface 44a.

The projection 44 has an outer diameter $D_4$ which is substantially the same as the outer diameters $D_1$ and $D_2$ (i.e., $D_1 \approx D_2 \approx D_4$). The projection 44 has a tapered shape in which the thickness in the axial direction gets smaller as extending from the outer circumferential surface 40a toward radially outside.

The rotor member 50 includes a first rotor core 52, a second rotor core 54, a plurality of magnets 56 and 58, a first end plate 60, a second end plate 62, a nonmagnetic member 63, and a plurality of tie rods 64.

Figure 4:
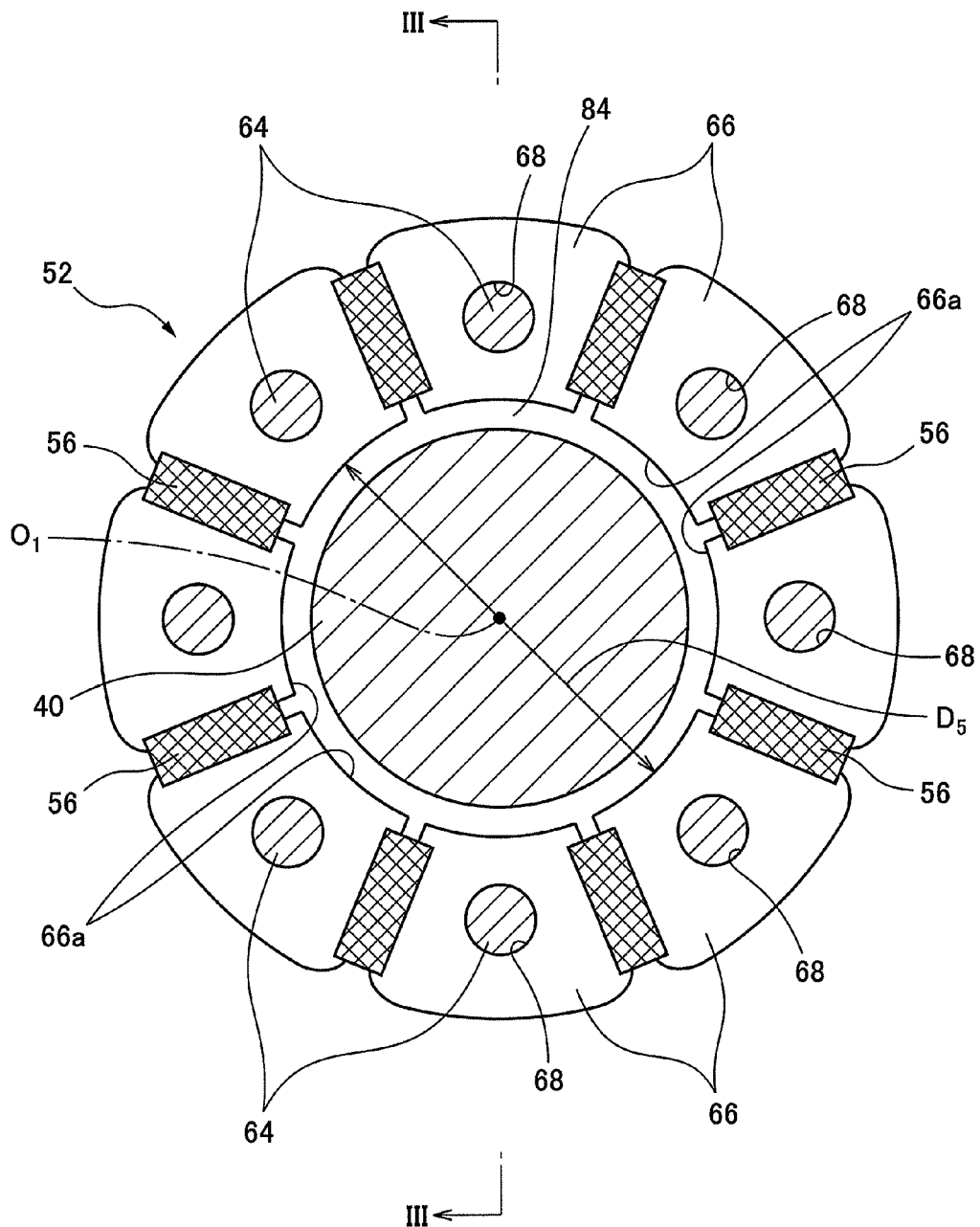
FIG. 4 is a cross-sectional view along IV-IV in FIG. 2.

As shown in FIG. 4, the first rotor core 52 includes a total of eight core segments 66 aligned in the circumferential direction at equal intervals. Each of the core segments 66 is comprised of a plurality of magnetic steel sheets (not shown) stacked in the axial direction, and has an inner circumferential surface 66a.

As shown in FIG. 3, a gap 84 is formed between the inner circumferential surface 66a and the outer circumferential surface 40a of the small diameter part 40. Further, each of the core segments 66 is formed with a through hole 68 extending through the core segment 66 in the axial direction.

In this embodiment, a total of eight magnets 56 are arranged so as to align in the circumferential direction at substantially equal intervals. Each of the magnets 56 is held between two core segments 66 adjoining each other in the circumferential direction.

Each of the magnets 56 is a rectangular plate member having a predetermined length, width, and thickness. Each of the magnets 56 is positioned with respect to the core segment 66 so that its length direction is substantially parallel to the axial direction, its width direction is substantially parallel to the radial direction, and its thickness direction is substantially parallel to the circumferential direction. Further, each of the magnets 56 is magnetized along its thickness direction.

The second rotor core 54 is arranged at axially rear side of the first rotor core 52 so as to adjoin the first rotor core 52, and has a configuration similar to the first rotor core 52. Specifically, the second rotor core 54 includes a total of eight core segments 70 aligned in the circumferential direction at substantially equal intervals. Each of the core segments 70 is comprised of a plurality of magnetic steel sheets (not shown) stacked in the axial direction, and has an inner circumferential surface 70a.

A gap 86 is formed between the inner circumferential surface 70a and the outer circumferential surface 40a of the small diameter part 40. Each of the core segments 70 is formed with a through hole 72 extending through the core segment 70 in the axial direction. The core segment 70 is positioned with respect to the core segment 66 so that the through hole 68 and through hole 72 are in communication with each other.

In this embodiment, a total of eight magnets 58 are arranged so as to align in the circumferential direction at substantially equal intervals. Each of the magnets 58 is held between two core segments 70 adjoining each other in the circumferential direction.

Each of the magnets 58 has a configuration similar to the magnets 56, and is positioned with respect to the core segment 70 so that its length direction is substantially parallel to the axial direction, its width direction is substantially parallel to the radial direction, and its thickness direction is substantially parallel to the circumferential direction.

The first end plate 60 is a ring-shaped plate having a cylindrical inner circumferential surface 74, and is made of a nonmagnetic material. The first end plate 60 is fixed to the first large diameter part 36 by shrinkage fit, so that the inner circumferential surface 74 is pressed against the outer circumferential surface 36a of the first large diameter part 36.

When the first end plate 60 is fixed to the first large diameter part 36, an axially rear end face 60a of the first end plate 60 contacts axially front end faces 66b of the core segments 66.

The first end plate 60 is formed with a total of eight through holes 76 arranged to align in the circumferential direction at substantially equal intervals. Each of the through holes 76 is arranged so as to be in communication with each of the through holes 68 formed at the core segments 66 (through holes 72 formed at core segments 70).

The second end plate 62 has a configuration similar to the first end plate 60. Specifically, the second end plate 62 is a ring-shaped plate having a cylindrical inner circumferential surface 78, and is made of a nonmagnetic material. The second end plate 62 is fixed to the second large diameter part 38 so that the inner circumferential surface 78 is pressed against the outer circumferential surface 38a. An axially front end face 62a of the second end plate 62 contacts axially rear end faces 70b of the core segments 70.

The second end plate 62 is formed with a total of eight through holes 80 arranged so as to align in the circumferential direction at substantially equal intervals. Each of the through holes 80 is arranged so as to be in communication with each of the through holes 72 formed at the core segments 70 (through holes 68 formed at core segments 66).

The nonmagnetic member 63 is a ring-shaped plate having a cylindrical inner circumferential surface 82. The inner circumferential surface 82 contacts the outer circumferential surface 44a of the projection 44. As an example, the inner circumferential surface 82 has an inner diameter which is smaller than the inner diameter $D_5$ (FIG. 4) of the core segments 66 and 70, and which is substantially the same as the outer diameter $D_4$ of the projection 44 (or slightly smaller than the outer diameter $D_4$).

The nonmagnetic member 63 is formed with a total of eight through holes 88 arranged to align in the circumferential direction at substantially equal intervals. Each of the through holes 88 is arranged so as to communicate with each of the through holes 68 formed at the core segments 66 (through holes 72 formed at core segments 70).

Each of a total of eight tie rods 64 is inserted into the through holes 76, 68, 88, 72, and 80 which are in communication with each other. Each of the tie rods 64 extends through the first end plate 60, core segment 66, nonmagnetic member 63, core segment 70, and second end plate 62 in the axial direction, and is fixed to the first end plate 60 at the axially front side, while fixed to the second end plate 62 at the axially rear side.

As explained above, in this embodiment, the projection 44, which projects out from the small diameter part 40 so as to contact the inner circumferential surface 82 of the nonmagnetic member 63, is provided. This projection 44 restricts movement of the nonmagnetic member 63 in the radial direction when the rotor member 50 tends to deform in the radial direction during rotation of the rotor 30.

Due to this, it is possible to prevent the tie rods 64 from bending and enhance the strength in the radial direction of the rotor member 50. Thereby, it is possible to prevent an eccentricity from being occurred in the rotor member 50 by the deformation of the rotor member 50 during rotation of the rotor 30.

Further, by contacting the projection 44 with the nonmagnetic member 63 in this way, it is also possible to prevent magnetic flux generated in the rotor cores 52, 54 from leaking to the shaft 32, in addition to the effect of preventing eccentricity of the rotor member 50. Accordingly, it is possible to prevent the rotational performance of the motor 10 from being degraded.

Further, in this embodiment, the projection 44 is formed integrally with the small diameter part 40. Due to this, the strength and durability of the projection 44 can be significantly improved, so it is possible to reliably prevent eccentricity of rotor member 50 over a long period.

Further, in this embodiment, the projection 44 has a tapered shape in which the thickness in the axial direction gets thinner toward radially outside. According to this configuration, the strength and durability of the projection 44 can be further improved.

Further, in this embodiment, the outer diameters $D_1$, $D_2$ and $D_4$ of the first large diameter part 36, the second large diameter part 38, and projection 44 are set to be substantially the same (i.e., $D_1 \approx D_2 \approx D_4$).

Due to this configuration, the rotor 30 can be manufactured by steps of assembling the rotor member 50 at first, and then inserting the shaft 32 into the rotor member 50, when manufacturing the rotor 30. According to this configuration, greater efficiency of the manufacturing process can be realized.

Note that, in the above-mentioned embodiment, the rotor member 50 includes the nonmagnetic member 63. However, the rotor member may not include the nonmagnetic member 63. In this case, the projection 44 may be formed so as to contact the inner circumferential surface of the rotor core.

Further, in the above-mentioned embodiment, the projection 44 extends over the entire circumference of the small diameter part 40. However, the projection may extend over a section of the circumference of the small diameter part 40. Alternatively, a plurality of projections may be provided so as to align in the circumferential direction.

Further, in the above embodiment, the rotor 30 is a so-called radial-type rotor. However, the rotor may include a cylindrical rotor core which surrounds the circumference of the shaft 32, wherein the rotor core may include a plurality of magnet housing holes aligned in the circumferential direction, and wherein a plurality of magnets are respectively housed in the magnet housing holes. In this case, the projection 44 may be formed so as to contact the inner circumferential surface of the rotor core.

Further, in the above embodiment, the rotor member 50 includes two rotor cores 52 and 54, and one nonmagnetic member 63, wherein the shaft 32 includes one projection 44.

However, the rotor member may include three or more rotor cores aligned in the axial direction, and two or more nonmagnetic members arranged between two rotor cores adjoining each other in the axial direction, wherein the shaft 32 may include two or more projections.

As an example, the rotor member includes first, second, and third rotor cores aligned in the axial direction; a first nonmagnetic member arranged between the first and second rotor cores adjoining each other in the axial direction; and a second nonmagnetic member arranged between the second and third rotor cores adjoining each other in the axial direction.

On the other hand, the shaft includes first and second projections formed at the small diameter part 40 so as to be separated from each other in the axial direction. In this case, the first projection is arranged so as to contact the first nonmagnetic member, while the second projection is arranged so as to contact the second nonmagnetic member.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

The invention claimed is:

1. A rotor of a motor, comprising:
   a shaft extending along an axis; and
   a tubular rotor member fixed to radially outside of the shaft so as to surround the shaft, wherein the shaft includes:
   a first part;
   a second part arranged so as to be separated from the first part in the axial direction;
   a third part extending between the first part and the second part and having an outer diameter smaller than the first part and the second part, a gap being formed between the third part and an inner circumferential surface of the rotor member; and
   a projection extending from the third part toward radially outside, wherein
   the rotor member includes:
      a nonmagnetic first end plate and a nonmagnetic second end plate arranged to be separated from each other in the axial direction;
      a plurality of rotor cores aligned in the axial direction and held between the first end plate and the second end plate; and
      a nonmagnetic member arranged between two of the plurality of rotor cores which adjoin each other in the axial direction, wherein
      the first part contacts an inner circumferential surface of the first end plate, the second part contacts an inner circumferential surface of the second end plate, and
      the projection contacts an inner circumferential surface of the nonmagnetic member,
      while the first part, the second part, and the projection do not contact inner circumferential surfaces of the plurality of rotor cores.

2. The rotor according to claim 1, wherein the projection extends over the entire circumference of the shaft.

3. The rotor according to claim 1, wherein the rotor member further includes
   a tie rod extending through the plurality of rotor cores and the nonmagnetic member in the axial direction.

4. The rotor according to claim 3, wherein the shaft further includes an output part extending in the axial direction from the first part so as to be connected to an external device, the output part having an outer diameter smaller than the inner circumferential surface of the first end plate.

5. A motor comprising the rotor according to claim 1.

* * * * *